Figure 1:
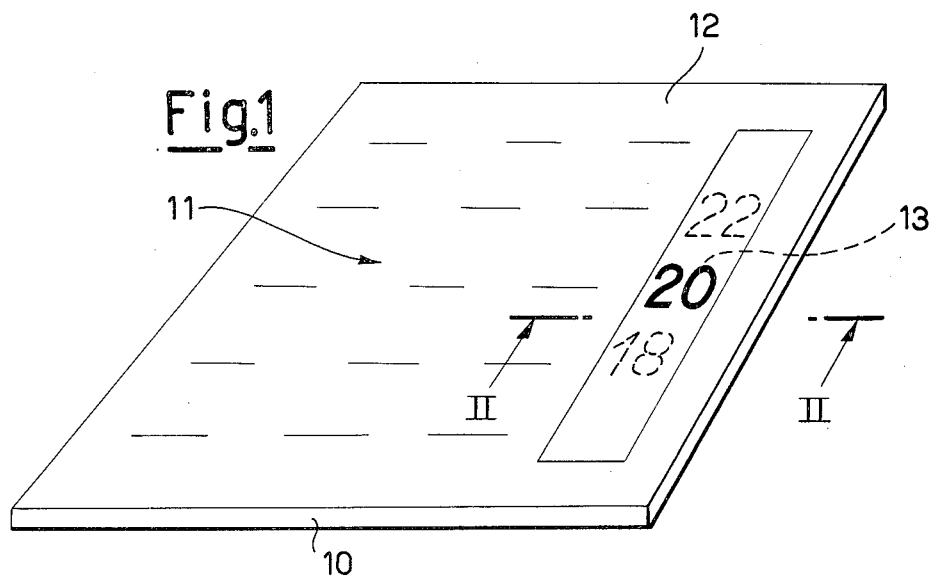

United States Patent [19]

Corsi

[11] 4,220,680

[45] Sep. 2, 1980

[54] MULTILAYERED STRUCTURE INCORPORATING A THERMOMETER

[75] Inventor: Pietro E. Corsi, Milan, Italy

[73] Assignee: S.p.A. Cellograf-Simp, Milan, Italy

[21] Appl. No.: 867,616

[22] Filed: Jan. 6, 1978

[30] Foreign Application Priority Data

Jan. 21, 1977 [IT] Italy .............................. 20492/77[U]

[51] Int. Cl.² .............................................. B05D 1/32
[52] U.S. Cl. ....................................... 428/1; 428/203; 428/204; 428/913
[58] Field of Search ................... 428/1, 203, 204, 913; 23/230 LC; 350/160 LC

[56] References Cited

U.S. PATENT DOCUMENTS

| | | | |
|---|---|---|---|
| 3,661,142 | 5/1972 | Flam | 428/1 |
| 3,898,354 | 8/1975 | Parker | 428/1 |
| 4,032,687 | 6/1977 | Hornsby | 428/1 |
| 4,060,654 | 11/1977 | Quenneville | 428/1 |
| 4,070,912 | 1/1978 | McNaughtan | 428/1 |

*Primary Examiner*—Marion McCamish
*Attorney, Agent, or Firm*—Cushman, Darby & Cushman

[57] ABSTRACT

In a multilayered structure of plastics materials in sheet form, such as a sheet carrying scripts, indications and the like, the improvement consisting in forming through an intermediate layer an opening or window to receive a liquid-crystal temperature indicator which remains permanently embedded in the multilayered structure. Useful articles e.g. a calendar incorporating a thermometer can be fabricated without any substantial increase of the cost of the article as such.

2 Claims, 3 Drawing Figures

MULTILAYERED STRUCTURE INCORPORATING A THERMOMETER

This invention intends to provide a flexible multilayered structure in which a temperature indicator is incorporated.

There are known in the art liquid-crystal temperature indicators, which are composed by a sheet supporting member for cholesteric crystals, these latter being usually micro-encapsulated, such crystals changing their colors at determined temperatures: they are distributed in different areas of certain configurations for representing the number which expresses in degrees the temperature at which the color is changed, or another conventional symbol, which appears in several colors as the different temperatures are attained. It thus occurs that there is displayed on the supporting member only the number which corresponds to the temperature to which the indicator is subjected.

It is likewise known that such indicators are mounted on rigid supporting members so as to provide a room thermometer.

This invention suggests to use such a type of indicator in combination with a material in the form of a comparatively pliable sheet so as to be able to equip therewith on article of common use having a sheet form.

A very suitable configuration as suggested by this invention comprises a layered structure which is formed by at least two sheets, at least the top one being transparent, a thermometric indicator in the form of a pliable strip of any shape being sandwiched therebetween.

A further embodiment of the invention comprises a multilayered structure in which the intermediate layer is sandwiched between a bottom supporting layer and a top transparent layer, an opening being formed through the intermediate layer, which is adapted to house the sheet supporting the cholesteric crystals forming the thermometer proper, such a supporting sheet being separated from the bottom layer by the agency of a porous flexible layer.

The layer of porous material can be a sheet material of a natural or synthetic origin, such as a common paper, for example. The other layers, conversely, are, of course, composed by sheets of plastics materials which are advantageously united together by any of the conventional welding procedures.

More particularly, with the latter embodiment, articles can be obtained which are exempt from defects such as air bubbles in correspondence with the area in which the thermometer proper is received.

It becomes thus possible to equip with a thermometric indicator any objects of common use, the indicator remaining concurrently both protected and firmly positioned.

For example, a sheet calendar can carry in a lateral position, and with little or no added bulk, a thermometer in strip form of the kind referred to above.

In general, sheet articles lend themselves well to the application of the principle of this invention, which, due to their nature, remain normally on a table or pinned up and thus in direct contact with the ambient air, of which the temperature can thus be read out.

In the accompanying drawings there are indicated, by way of example, two embodiments of the invention.

Figure 2:
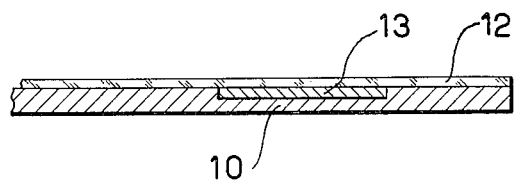
Figure 3:
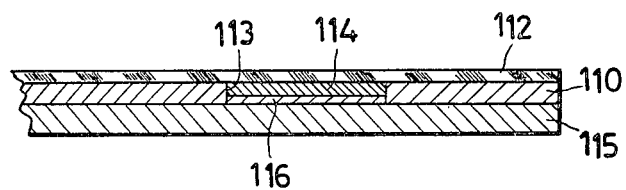

FIG. 1 is a perspective view of an embodiment,
FIG. 2 is a cross-sectional view of the embodiment of FIG. 1 taken along the line II—II thereof; and
FIG. 3 is a cross-sectional view of another embodiment.

Having now reference to FIGS. 1 and 2, a bottom layer 10 carries the printed script, generally indicated as 11 and showing any indication or image. In an area of the material 10 there is housed in a corresponding seat the strip 13 which forms the liquid crystal temperature indicator of the kind referred to above, in which the supporting member is pliable.

Such an assembly is then covered by a layer 12 of a transparent material, through which the indications of the thermometer 13 can conveniently be read out.

Of course, the base layer 10 can be of any conventional type and can be also a multilayered structure made of a number of sheets of any nature.

A sheet article of common use and carrying other information or images is thus equipped with a thermometer without any substantial price increase excepted the one inherent in the strip as itself, since it is already usual practice to cover with a transparent layer of a plastics material the sheet articles to which a glossy and hard surface must be imparted.

With reference to FIG. 3, which shows another embodiment of the invention, an opening 113 is formed through the layer 110, such an opening containing the supporting member 114 which carries the cholesteric crystals which form the temperature indicators of the kind referred to above, Quite characteristically, the supporting member 114 is separated from the bottom layer 115 by means of a corresponding supporting member 116 made of a porous and flexible material. Such a material can be, advantageously, paper and numerous tests have shown that such a multilayered structure is exempt from the formation of undesirable internal air bubbles in correspondence with the seat for the thermometer proper.

We claim:

1. A multilayered sheet material comprising a transparent upper layer and underlying sheet means having a recess formed therein, said recess housing a layer of porous flexible material and housing a temperature indicating strip of pliable material superimposed on said layer of porous material, said temperature indicating strip containing liquid crystals which change their color as the temperature varies.

2. Sheet material as in claim 1 wherein said sheet means includes first and second lower layers, said recess being formed by an opening through the first lower layer, said second lower layer being arranged under said first lower layer.

* * * * *

UNITED STATES PATENT AND TRADEMARK OFFICE
CERTIFICATE OF CORRECTION

PATENT NO. : 4,220,680
DATED : September 2, 1980
INVENTOR(S) : Pietro Enrico Corsi It is certified that error appears in the above—identified patent and that said Letters Patent is hereby corrected as shown below:

On the front page format, paragraph [30] should read:

Signed and Sealed this

Second Day of June 1981

[SEAL]

Attest:

RENE D. TEGTMEYER

Attesting Officer     Acting Commissioner of Patents and Trademarks